(12) United States Patent
Fluckiger

(10) Patent No.: US 8,995,474 B1
(45) Date of Patent: Mar. 31, 2015

(54) SIDELOBE INFORMATION SUPPRESSION VIA ANTENNA MODE MODULATION

(75) Inventor: David Ulrich Fluckiger, Allen, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/195,621

(22) Filed: Aug. 1, 2011

Related U.S. Application Data

(63) Continuation of application No. 10/866,853, filed on Jun. 14, 2004, now abandoned.

(51) Int. Cl.
*H04L 27/00* (2006.01)
*H04K 1/10* (2006.01)
*H01Q 3/00* (2006.01)

(52) U.S. Cl.
CPC .. *H04K 1/10* (2013.01); *H01Q 3/00* (2013.01); *H04L 27/0008* (2013.01)
USPC ............................ 370/527; 342/372; 342/377

(58) Field of Classification Search
USPC .............. 342/372, 377, 379; 380/31, 33, 258, 380/255, 270; 343/777; 375/268; 455/276.1; 370/527
IPC ................................. H04L 27/0008; H04K 1/10
See application file for complete search history.

(56) References Cited

U.S. PATENT DOCUMENTS

| | | | |
|---|---|---|---|
| 4,397,034 A * | 8/1983 | Cox et al. | 380/258 |
| 6,275,679 B1 * | 8/2001 | Elam et al. | 342/373 |
| 6,643,000 B2 | 11/2003 | Fluckiger | |
| 6,747,584 B2 | 6/2004 | Havelock | |
| 2005/0037733 A1 | 2/2005 | Coleman et al. | |
| 2005/0059388 A1 | 3/2005 | Haines et al. | |
| 2005/0232057 A1 * | 10/2005 | Hansen et al. | 365/230.01 |
| 2005/0248497 A1 | 11/2005 | Chun et al. | |
| 2006/0066484 A1 | 3/2006 | Sayers | |

OTHER PUBLICATIONS

R. Vescovo, Constrained and Unconstrained Synthesis of Array Factor for Circular Arrays, IEEE Transactions on Antennas and Propagation, vol. 43(12), p. 1405-1410, Dec. 1995.*

* cited by examiner

*Primary Examiner* — Gregory C Issing
*Assistant Examiner* — Fred H Mull
(74) *Attorney, Agent, or Firm* — Burns & Levinson, LLP; Josephs M Maraia

(57) ABSTRACT

According to one embodiment of the invention, a method of signal modulation includes modulating a signal by providing respective sets of weights to an active array antenna. Each set of weights specifies the same preferential direction for transmission by the active array antenna, but corresponds to a respective different one of a phase and amplitude of the signal in the preferential direction. The respective ones of a phase in the preferential direction provide modulation of the signal.

23 Claims, 3 Drawing Sheets

SIDELOBE INFORMATION SUPPRESSION VIA ANTENNA MODE MODULATION

RELATED APPLICATIONS

This application is a continuation of U.S. application Ser. No. 10/866,853 filed Jun. 14, 2004 now abandoned entitled "Sidelobe Information Suppression Via Antenna Mode Modulation."

GOVERNMENT RIGHTS

This invention was made with Government support under U.S. Government Grant No. DARPA MDA972-01-C-0061. The government may have certain rights in this invention.

TECHNICAL FIELD OF THE INVENTION

This invention relates generally to communications and in particular to a method of sidelobe information suppression using antenna mode modulation.

BACKGROUND OF THE INVENTION

Antennas that adjust the phase and amplitude of specific antenna elements are called active array antennas. The settings for associated phase/amplitude control devices are called antenna weights or a weight set. Active array antennas are used to make the radiated energy preferentially transmit to or receive from certain directions. When active arrays are used in wireless communications, the weights are set so the antenna beam points in the direction of the intended receiver. During the transmission, the weights are fixed. The set of weights that result in the antenna beam pointing in a preferential direction are not unique, however; there are several sets of weights that can result in similar beams pointing in similar directions.

In general, it is not possible to build an antenna where all the energy is pointed in one beam; some small amount of energy is transmitted into unintended directions. These other unintended small beams are called sidelobes. The security of such communications is limited by the sidelobe emissions, as such sidelobes allow eavesdropping on such signals. This is undesirable. Attempts at addressing this problem have focused primarily on reducing the level of emission in the sidelobes but the information is not eliminated. Generally, beam shaping techniques are used to maximize the energy in the main beam lobe, specifying the small sidelobe emission. Power is then reduced so that the main beam is just adequate to accomplish the mission.

SUMMARY OF THE INVENTION

According to one embodiment of the invention, a method of signal modulation includes modulating a signal by providing respective sets of weights to an active array antenna. Each set of weights specifies the same preferential direction for transmission by the active array antenna, but corresponds to a respective different one of a phase and amplitude of the signal in the preferential direction. The respective ones of a phase in the preferential direction provide modulation of the signal.

Embodiments of the invention provide numerous technical advantages. Some embodiments may benefit from some, none, or all of these advantages. In one embodiment, a form of modulation of a signal allows secure transmission that is not susceptible to eavesdropping in the sidelobes. In particular, this occurs because modulation of the phase in the main lobe occurs with little effect on the phase in the sidelobes. Such modulation occurs by selecting different sets of weights all corresponding to the same preferential direction of a main beam, but that correspond to different phases of the main beam. However, the corresponding phases in the sidelobes are not significantly different. Thus, in contrast to conventional techniques that focus on reducing power to the sidelobes, this approach eliminates information in the sidelobes by modulating the main lobe in a manner that does not have a corresponding identifiable effect on the sidelobes.

Other technical advantages are readily apparent to one skilled in the art.

BRIEF DESCRIPTION OF THE DRAWINGS

A more complete understanding of example embodiments of the invention will be apparent from the detailed description taken in conjunction with the accompanying drawings in which.

DETAILED DESCRIPTION OF EXAMPLE EMBODIMENTS OF THE INVENTION

Example embodiments of the invention and its advantages are best understood by referring to FIGURES 1A through 4 of the drawings, like numerals being used for like and corresponding parts of the various drawings.

FIGS. 1A-1D are graphs showing the resulting amplitude and phase structure of an active antenna array beam in the azimuthal plane. As described above, an antenna that has devices used to adjust the phase and the amplitude of specific antenna elements are referred to as an active array antenna. The settings for these phase/amplitude control devices are called antenna weights or a weight set. Active arrays are used to make the radiated energy preferentially transmit (or receive) certain directions, and when active arrays are used in wireless communications, the weights are set to the antenna so that the antenna beam points in the direction of the intended receiver. During the transmission, the weights are constant, but the set of weights that result in the antenna beam pointing in the particular direction is not unique. There are several weight sets that can give similar beams. When the antenna weights are fixed, the modulation of the input energy is transmitted out the antenna in the main beam as well as the sidelobes, resulting in the possibility of eavesdropping by examination of the information content in the sidelobes.

The teachings of the invention recognize that different sets of antenna weights may correspond to similar main beam structures, but that those same sets of weights correspond to differing sidelobe structures. Further, this fact may be utilized to provide a different modulation mode, referred to herein as "antenna mode modulation," wherein a plurality of sets of weights corresponding to the same antenna direction are used to modulate the signal, resulting in modulation occurring in the preferential direction but with little or no effect in sidelobes.

FIGS. 1A-1D further illustrate this concept. These graphs correspond to a 21 element ring array but the concept is not specific to such an array and is generalizable. In this particular example, a ring array is formed of 21 dipole elements, each dipole is 1 meter long by 5 millimeters in diameter. The array radius is 3.26 meters, and assumed to be in free space. The Vescovo algorithm (IEEE Trans Ant Prop, 43 (1405) 1995), is used to estimate the element coefficients, or weights, for beam forming. The algorithm is used to find the array phase/amplitude coefficients for a principal beam that is 2.8 $\lambda$/D radiance (slightly larger than the diffraction limit of the array aperture). Solutions were found with a phase mode of L=3 and −3.

Figure 1A:
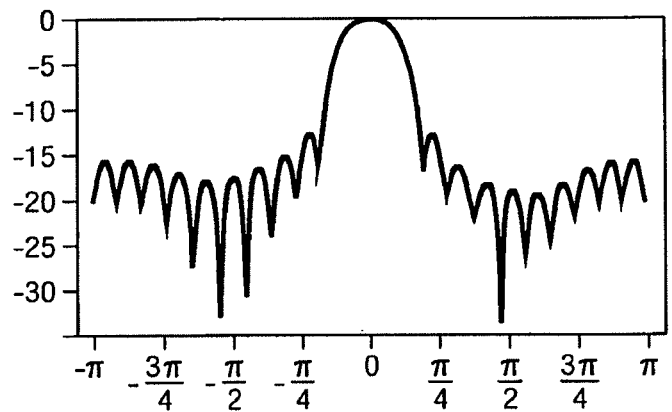
FIGS. 1A-1D are a series of graphs illustrating the resulting amplitude and phase structure of an active array antenna beam according to the teachings of the invention, showing different phase structure for the sidelobes and constant phase structure for the main beam.
Figure 1B:
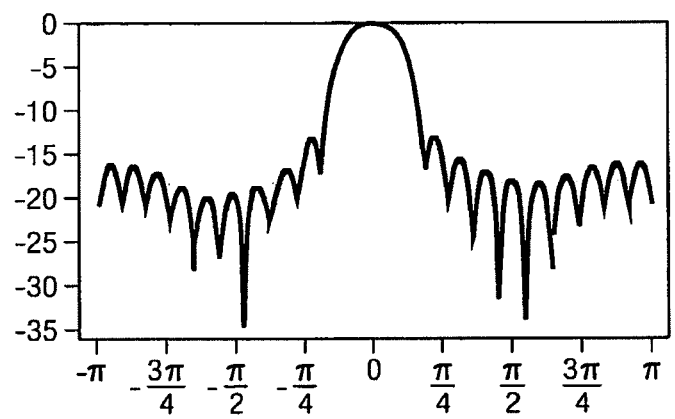
Figure 1C:
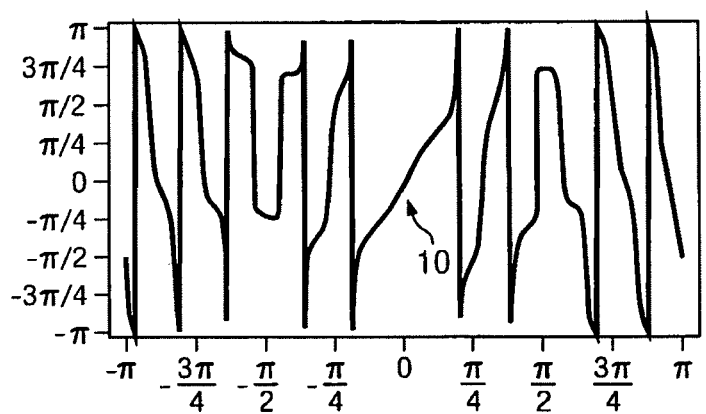
Figure 1D:
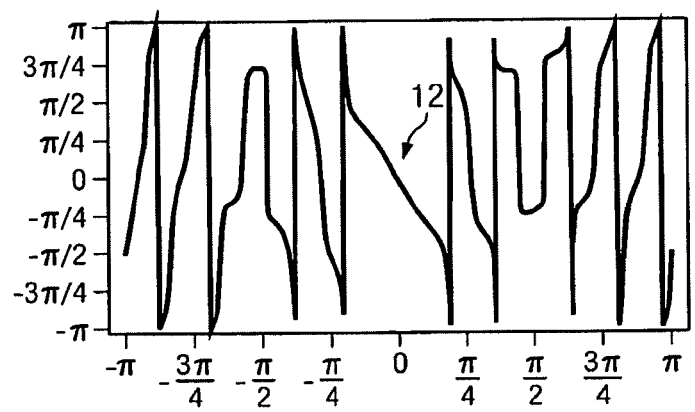

FIGS. 1A and 1C correspond to a phase mode of L=3, and FIGS. 1B and 1D correspond to a phase mode state of L=−3. FIGS. 1A and 1B each show amplitude in the preferential direction, corresponding to zero on the horizontal axis, as well as amplitude in the sidelobes. FIGS. 1C and 1D illustrate the phase associated with the steered beam, both in the preferential direction and in the sidelobes. As illustrated, these figures show that the phase at the beam center is zero for both phase mode states, as indicated by reference numerals 10 and 12 but that the phase slope switches sign. Thus when switching the antenna mode from FIGS. 1A and 1C to FIGS. 1B and 1D, the main beam is unaffected in amplitude and phase at the beam center; however, away from the main beam and in the side lobes there is significant change. In this particular case the two phase mode solutions are mirror images. Thus by rapidly and randomly switching between these two antenna weight sets during a transmission, both the phase and the amplitude of the beam away from the center of the main beam has an additional random character which essentially eliminates the intelligibility of the intended modulation.

The teachings of the invention recognize that a spy listening from any particular sidelobe direction will see both amplitude and phase modulation as a result of the "phase mode"modulation caused by the modulation of the antenna weight set, corresponding to different weight sets, even when the main channel is unmodulated. In this realization the toggling of the antenna mode does not substantially affect the main lobe or amplitude structure. An alternative realization is to modulate the phase of the main beam directly by changing the weight sets. This concept is further illustrated with reference to FIG. 2.

Figure 2:
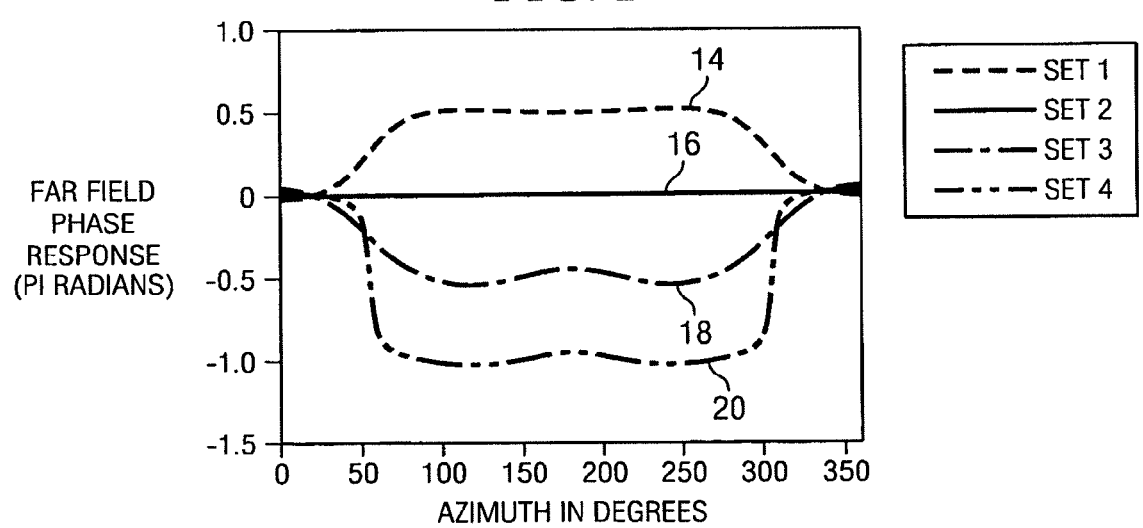
FIG. 2 is a graph illustrating four different curves corresponding to four different sets of weights allowing antenna mode modulation while suppressing information in the sidelobes.

FIG. 2 illustrates the phase structure associated with four different sets of antenna weights as a function of the azimuthal direction (around the antenna) for another example antenna. This particular example involves a five element array. The antenna weight sets are chosen to have the four phase levels necessary to encode a QPSK signal. In this example the intended receiver is located at 180 degrees in the azimuthal direction. The necessary phase (QPSK) codes are transmitted by switching between the four sets of antenna weights, resulting in the four different curves 14, 16, 18, and 20. At 180 degrees the phases significantly differ, corresponding to the intended message. However, a spy listening at zero or 360 degrees would not see a significant phase shift between the various antenna modes and therefore not see the QPSK codes. Thus, the same preferential direction can be maintained with different phases in the preferential direction while at the same time having the a different phase in the sidelobes. This allows clandestine transmission of information by changing between the different antenna modes (different sets of weights). Such transmission may be performed in conjunction with transmitting additional information over the main beam in a conventional manner; of course, such information is subject to eavesdropping through the sidelobes. This approach has the potential for eliminating information from the sidelobe beams, without impacting the information content in the main beam.

Figure 3:
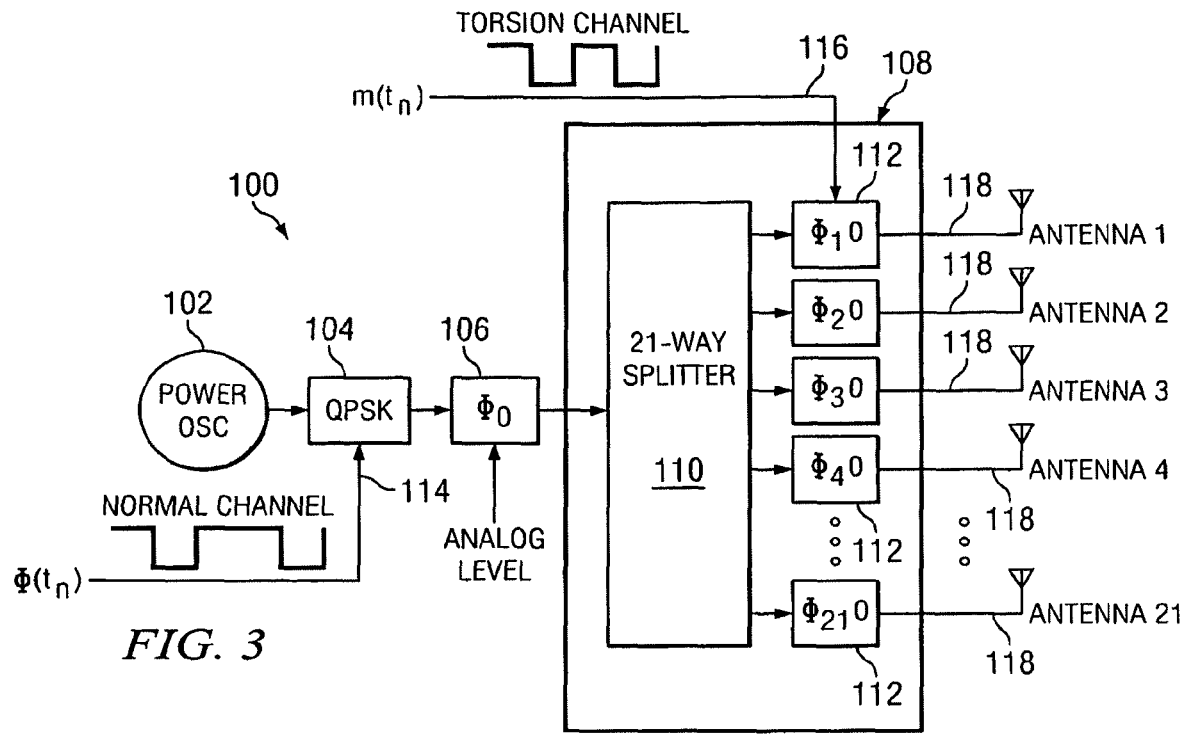
FIG. 3 is a block diagram illustrating one example system for antenna mode modulation according to the teachings of the invention.

FIG. 3 is a block diagram illustrating one example of a system for providing antenna mode modulation according to the teachings of the invention. System 100 includes a power oscillator 102, an encoder 104, which in this example is a quad phase shift key encoder, an analog level generator 106, a coefficient or weight generator 108, and a plurality of antenna elements 118. Power oscillator 102 provides an oscillating signal used by encoder 104 to encode a "normal" channel 114 of data. Analog level generator 106 adjusts the overall phase of the ring array , allowing the main lobe to be pointed in a particular direction. Coefficient generator 108 includes a splitter 110 and a plurality of phase/amplitude modules 112. Phase/amplitude modules 112 receive a phase mode channel 116, corresponding to the selection of a particular predefined set of weights, which generate the desired antenna mode during transmission over a particular time interval such as a chip time of the normal channel 114. Splitter 110 provides the coded normal channel as well as the analog level specifying the direction in which the main lobe is to be pointed. In this manner, modulation of a "phase mode" channel can occur without affecting the normal channel modulation. The phase mode channel 116, controls the modulation of the appropriate antenna weight sets which eliminates the intelligibility of the normal channel 114, information in the sidelobes, as described above.

Phase/amplitude modules 112 within coefficient generator 108 generate the appropriate phase and amplitude levels to respective antenna elements according to conventional techniques, one example of which is the above-described Vescovo algorithm. The above described system 100 is applicable to systems such as the system of FIG. 1 where the phase mode channel calls for a +3 mode or a −3 mode but it is readily generalizable to more than two phase mode states by increasing the number of elements and size of the array.

Figure 4:
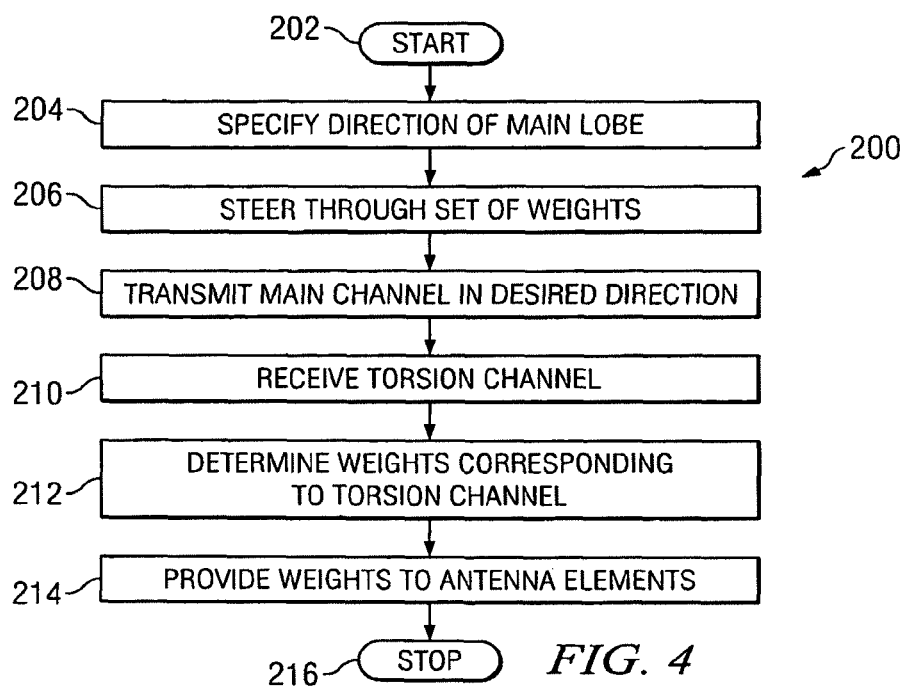
FIG. 4 is a flowchart illustrating an example method according to the teachings of the invention for antenna mode modulation.

FIG. 4 is a flowchart illustrating a method of providing antenna mode modulation according to the teachings of the invention. Method 200 begins at step 202. At step 204 the direction of the main lobe is specified. This corresponds to setting the main beam of the antenna array at a desired location for reception. As described above, this may be accomplished by providing a set of weights to a plurality of antenna elements in the active array. As also described, more than one set of coefficients may be used to steer the main beam in the desired direction. At step 206, the antenna array is steered through the use of the specified weights. At step 208, data in a "main" channel may be transmitted in the desired direction. This is the conventional mode of transmission using an active array antenna, and as described above, is susceptible to eavesdropping on the sidelobes because the modulated signal is modulated the same in the main lobe as in the sidelobes. Although techniques exist for minimizing the amplitude of the signal in the sidelobes, the signal may often still be detected.

At step 210, data in the phase mode or antenna mode modulation channel is received. This is a separate data channel including data that is designed to modulate or control the selection of the antenna weight set to eliminate the main beam information from the sidelobes. In response to receiving the phase mode channel data, weights are determined at step 212 corresponding to the selection identified by the phase mode channel data. In particular, the determination of the weights will depend on the number of states available. In the above described example in which two phase mode states were available, the phase mode channel switches between two different states, resulting in two possible different phases states for the side lobes. However, more than two states may available (such as in FIG. 2) and the number of states may allow for different modulation techniques. Regardless of the number of states and the approach used, a set of weights is selected that corresponds to a particular phase desired. Selection of these weights may be determined according to conventional techniques used in conjunction with picking the appropriate set from the possible sets of weights to properly encode data on the phase mode channel.

At step 214, the weights are provided to antenna elements in the antenna array system to control the individual steering of each antenna element and the resulting direction of the main lobe. As described before, the direction of the main lobe remains constant in this procedure, but the associated phase is modified from the previous choice of phase depending upon the sets of weights used. The method concludes at step 216.

Thus, a system and method are provided that allow transmission of information in a chosen direction without being susceptible to detection through eavesdropping on associated sidelobes.

Although the present invention and its advantages have been described in detail, it should be understood that various changes, substitutions, and alterations can be made therein without departing from the spirit and scope of the invention as defined by the appended claims.

What is claimed is:

1. A method of signal modulation, comprising:
   determining a preferential direction for transmission of a main beam radiated by an active array antenna, the preferential direction corresponding to the location of an intended recipient of a signal, the main beam having the greatest energy of a radiation pattern radiated by the active array antenna;
   selecting by a weight generator a plurality of sets of weights of an active array antenna such that each set of weights:
      steers the main beam in the preferential direction corresponding to the location of the intended recipient of the signal;
      steers a sidelobe radiated by the active array antenna in a direction different from the preferential direction;
      provides a respective phase of the main beam in the preferential direction that is different from the respective phases at the main beam provided by each other set of weights;
      generates a unique sidelobe pattern structure relative to sidelobe pattern structures of the other sets of weights; and
   consecutively encoding, by an encoder, a portion of a message in the signal by modulating the phase of the main beam in the preferential direction using the plurality of sets of weights of the active array antenna by randomly selecting a set of weights from the selected plurality of sets of weights, until an entirety of the message has been encoded.

2. The method of claim 1, wherein the phase of the signal at the sidelobe is substantially equal to zero for each one of the plurality of sets of weights of the active array antenna.

3. The method of claim 1, wherein the preferential direction for transmission of the main beam radiated by the active array antenna is positioned approximately 180 degrees from the sidelobe radiated by the active array antenna.

4. The method of claim 1, wherein the active array antenna is a ring array.

5. The method of claim 1, wherein the plurality of sets of weights consists of four sets of weights.

6. The method of claim 1, wherein the encoded information is not decodable at the sidelobe.

7. A system comprising:
   an active array antenna configured to radiate a main beam in a preferential direction corresponding to the location of an intended recipient of a signal, the main beam having the greatest energy of a radiation pattern radiated by the active array antenna;
   a weight generator configured to select a plurality of sets of weights such that each set of weights is configured to:
      steer the main beam in the preferential direction corresponding to the location of the intended recipient of the signal;
      steer a sidelobe radiated by the active array antenna in a direction different from the preferential direction;
      provide a respective phase of the main beam in the preferential direction that is different from the respective phases at the main beam provided by each other set of weights;
      generate a unique sidelobe pattern structure relative to sidelobe pattern structures of the other sets of weights; and
   an encoder configured to consecutively encode a portion of a message in the signal by modulating the phase of the main beam in the preferential direction using the plurality of sets of weights of the active array antenna by randomly selecting a set of weights from the selected plurality of sets of weights, until an entirety of the message has been encoded.

8. The system of claim 7, wherein the phase of the signal at the sidelobe is substantially equal to zero for each one of the plurality of sets of weights of the active array antenna.

9. The system of claim 7, wherein the preferential direction for transmission of the main beam radiated by the active array antenna is positioned approximately 180 degrees from the sidelobe radiated by the active array antenna.

10. The system of claim 7, wherein the active array antenna is a ring array.

11. The system of claim 7, wherein the plurality of sets of weights consists of four sets of weights.

12. The system of claim 7, wherein the information encoded by the encoder is not decodable at the sidelobe.

13. The system of claim 7, wherein the phase of the signal at approximately 180 degrees from the preferential direction is substantially the same for all of the plurality of sets of weights.

14. The system of claim 7, and further comprising an analog level generator configured to specify the direction that the main beam is steered.

15. A method of signal modulation, comprising:
   consecutively encoding by an encoder a portion of a message in of a signal radiated by an active array antenna, the signal having a radiation pattern comprising a main beam and a plurality of sidelobes, the main beam having greater energy than the respective energies of each of the plurality of sidelobes, the encoding comprising modulating a phase of the main beam in a preferential direction using a plurality of sets of weights of the active array antenna by randomly selecting a set of weights from the selected plurality of sets of weights, until an entirety of the message is encoded,
   wherein the encoding comprises modulating the phase of the main beam by selecting by a weight generator a plurality of sets of weights of an active array antenna such that each set of weights generates a unique sidelobe pattern structure relative to sidelobe pattern structures of the other sets of weights.

16. The method of claim 15, wherein the encoding comprises modulating the phase of the main beam by selecting a plurality of sets of weights of an active array antenna such that each set of weights provides a respective phase of the main beam in the preferential direction that is different from the respective phases at the main beam provided by each other set of weights.

17. The method of claim 15, wherein the encoding comprises modulating the phase of the main beam by selecting a plurality of sets of weights of an active array antenna such that each set of weights:
- steers the main beam in a preferential direction corresponding to a location of an intended recipient of the signal;
- steers the plurality of sidelobes in respective direction different from the preferential direction;
- provides a respective phase of the main beam in the preferential direction that is different from the respective phases at the main beam provided by each other set of weights; and
- provides a respective phase at the sidelobe that is substantially equal to the respective phases at the sidelobe provided by each other set of weights.

18. The method of claim 15, wherein the encoding comprises modulating the phase of the main beam while the phase of each of the sidelobes remains substantially equal to zero.

19. The method of claim 15, wherein the main beam is positioned approximately 180 degrees from at least two of the plurality of sidelobes.

20. The method of claim 15, wherein the active array antenna is a ring array.

21. The method of claim 15, wherein the encoding comprises modulating the phase of the main beam using a plurality of phases, each phase being different from each other phase.

22. The method of claim 15, wherein the encoded information is not decodable at the sidelobe.

23. The method of claim 15, wherein the encoding comprises modulating the phase of the main beam while the main beam is constantly steered in one preferential direction corresponding to the location of an intended recipient of a signal.

* * * * *